United States Patent [19]

Sheynblat

[11] Patent Number: 5,748,651
[45] Date of Patent: May 5, 1998

[54] OPTIMUM UTILIZATION OF PSEUDORANGE AND RANGE RATE CORRECTIONS BY SATPS RECEIVER

[75] Inventor: Len Sheynblat, Belmont, Calif.

[73] Assignee: Trimble Navigation Limited, Sunnyvale, Calif.

[21] Appl. No.: 435,552

[22] Filed: May 5, 1995

[51] Int. Cl.⁶ .................................................. H03M 13/00
[52] U.S. Cl. ............................................................ 371/49.1
[58] Field of Search ................................................ 371/49.1

[56] References Cited

U.S. PATENT DOCUMENTS 5,323,322   6/1994   Mueller et al. .................... 364/449

Primary Examiner—Stephen M. Baker
Attorney, Agent, or Firm—Boris G. Tankhilevich

[57] ABSTRACT

The partial decoding algorithm for decoding the partially damaged differential SATPS messages and the decoding device is disclosed. The algorithm is based on the modified parity test. The information contained in the decoded messages is used for the high level differential SATPS testing.

13 Claims, 12 Drawing Sheets

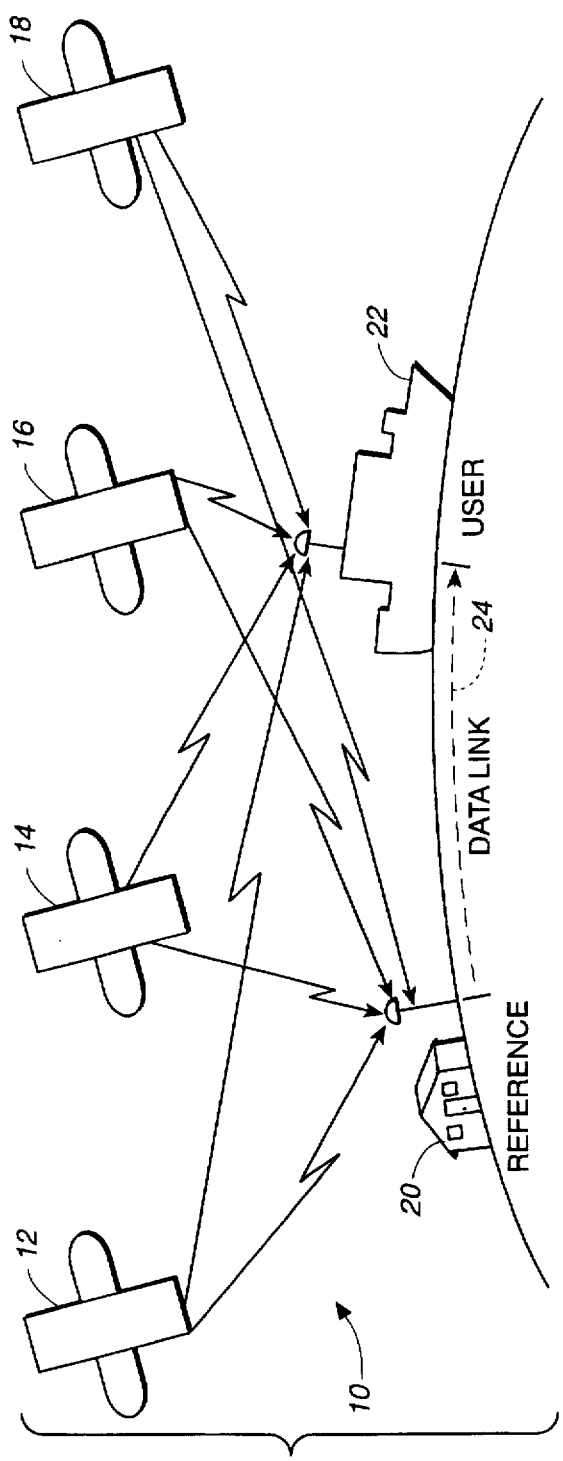
FIG._1
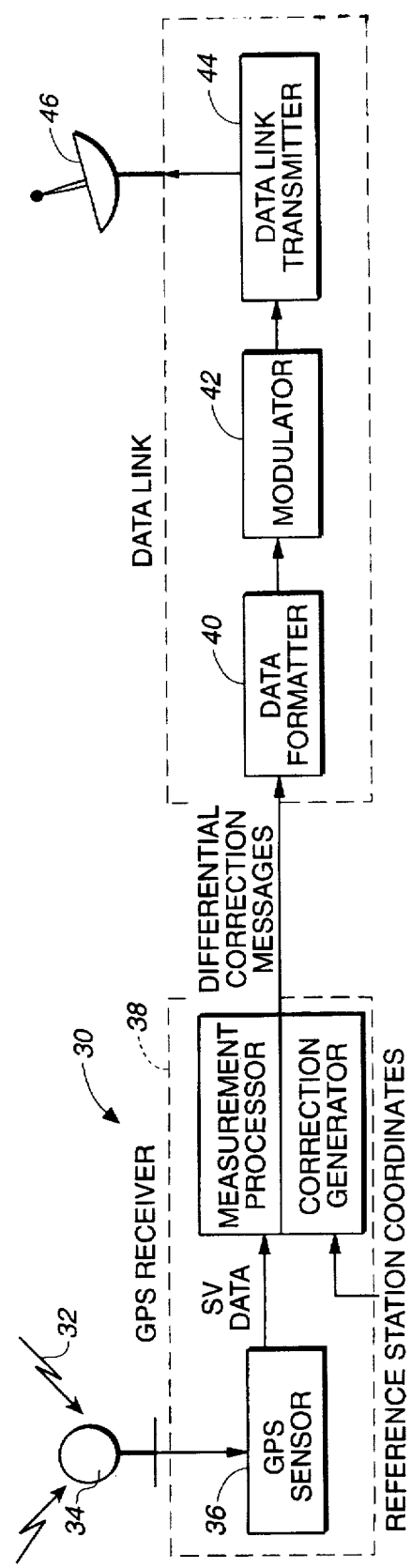
FIG._2

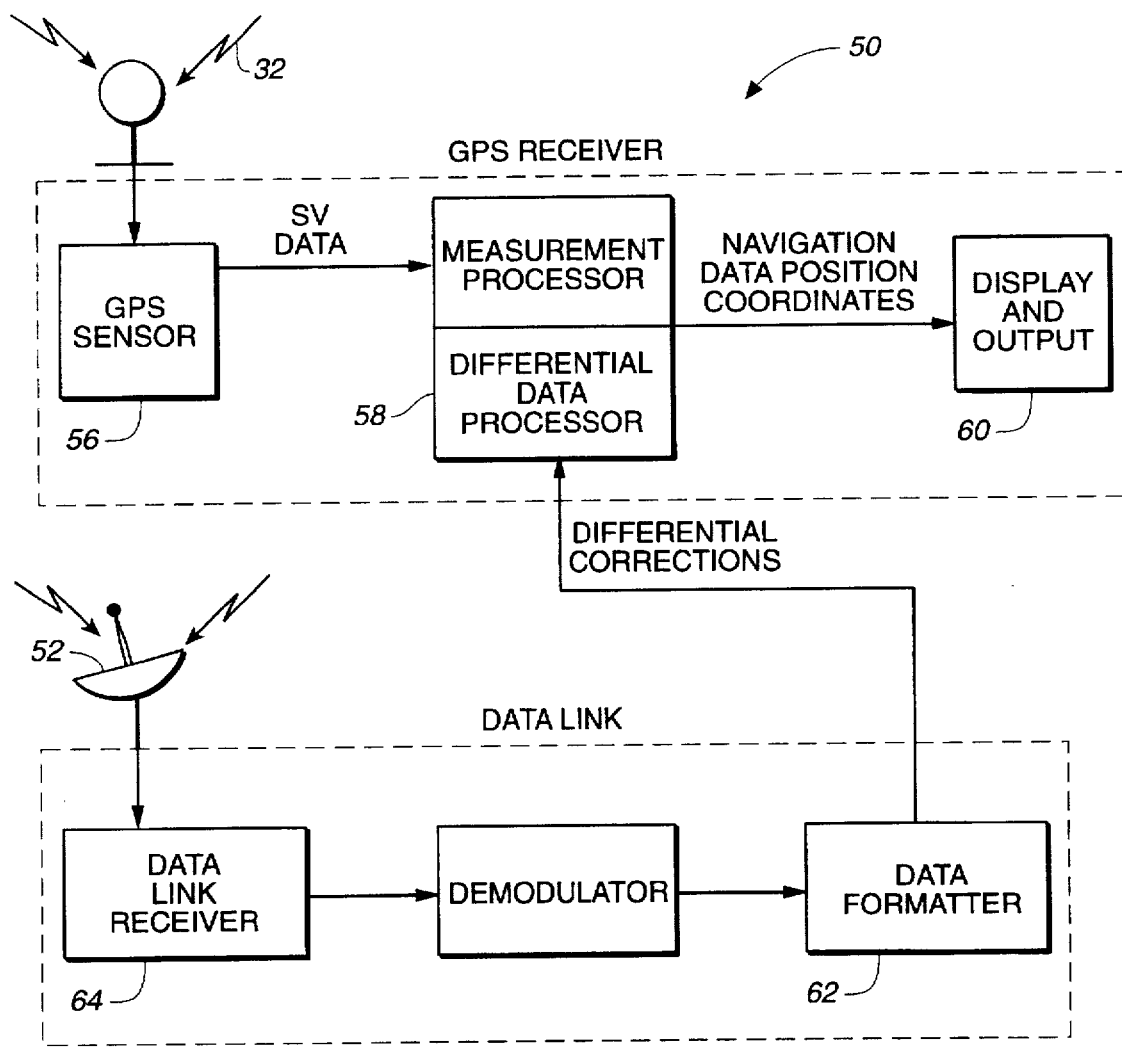
FIG._3

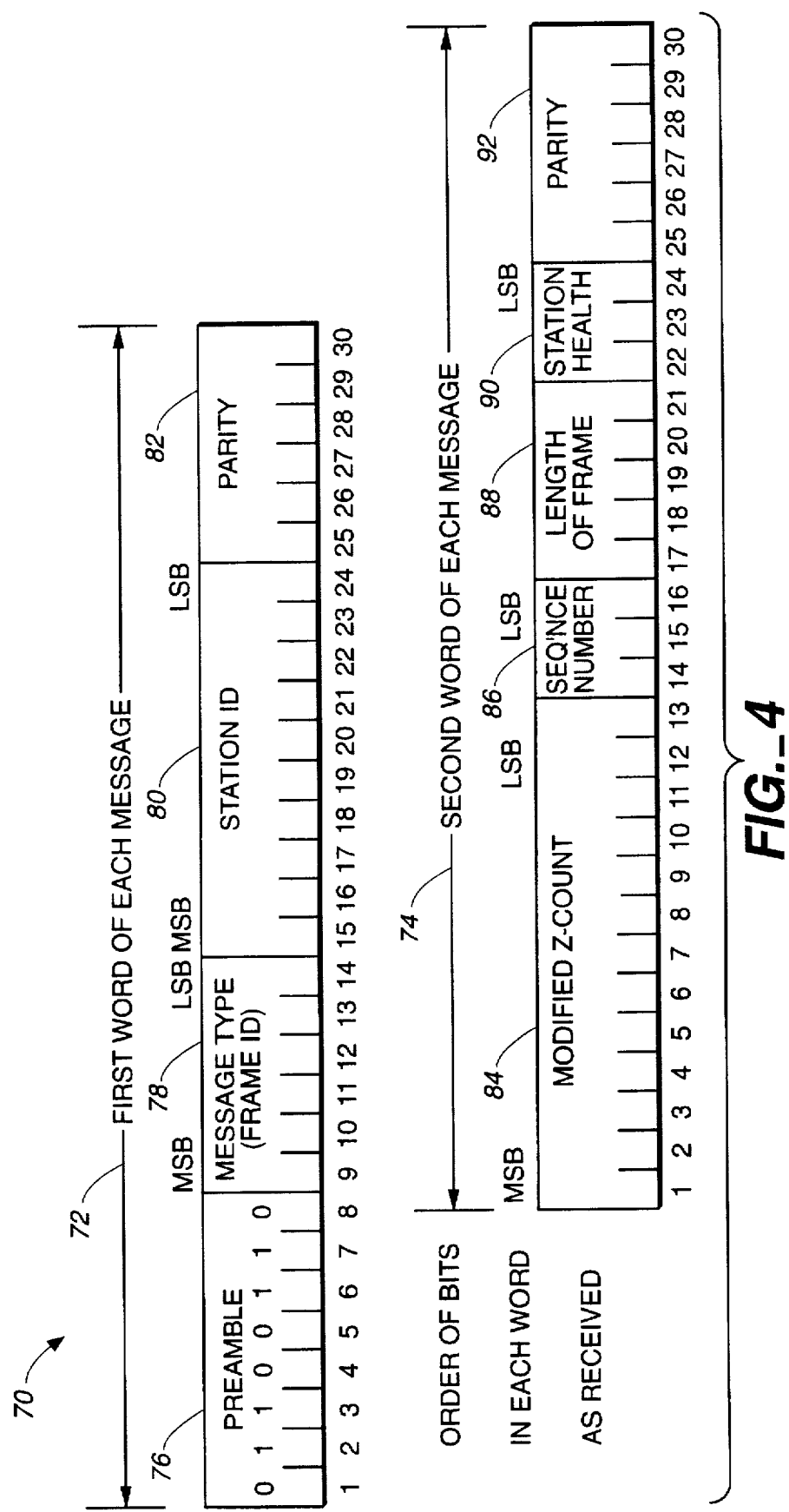
FIG._4

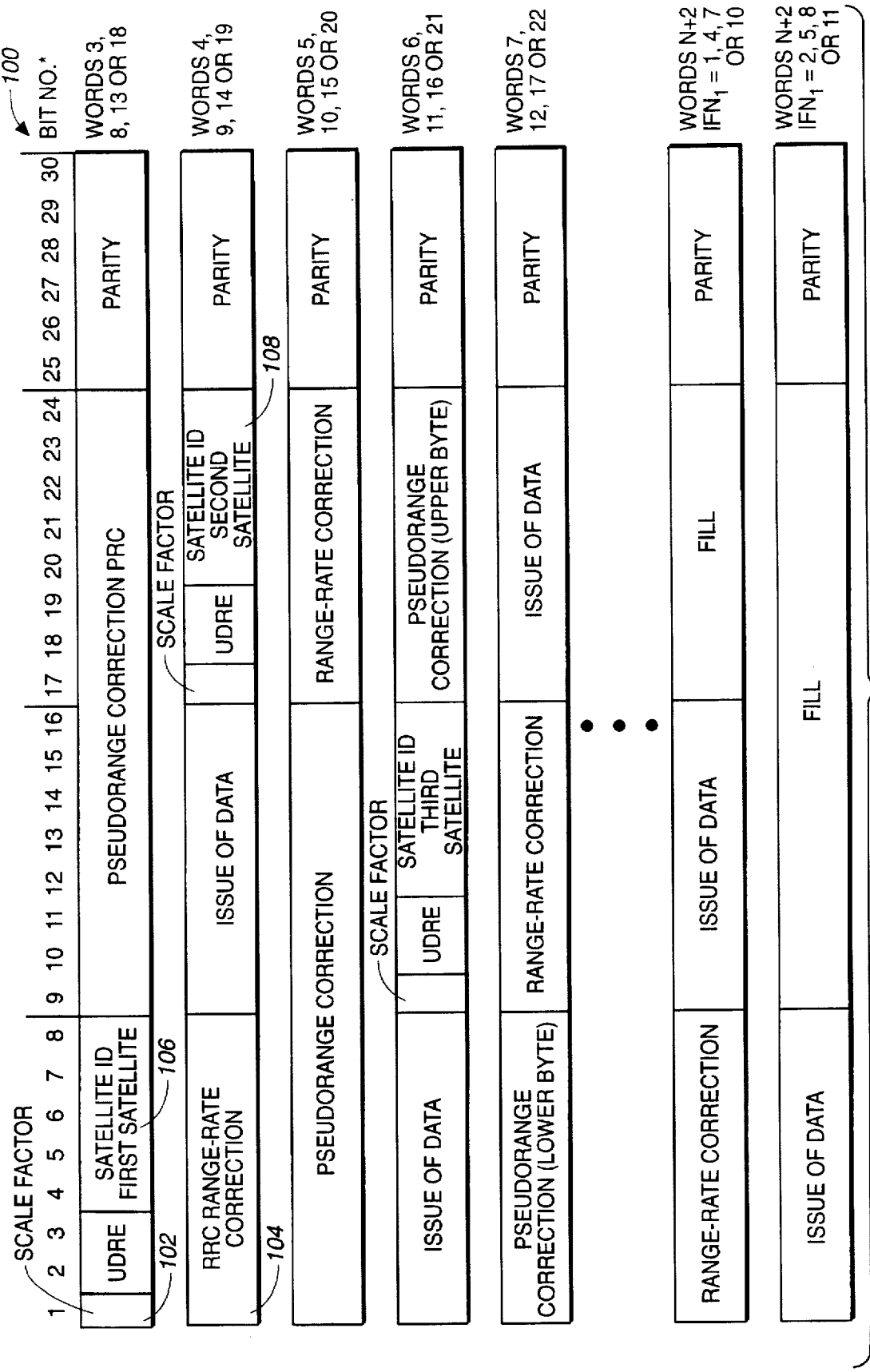
FIG._5

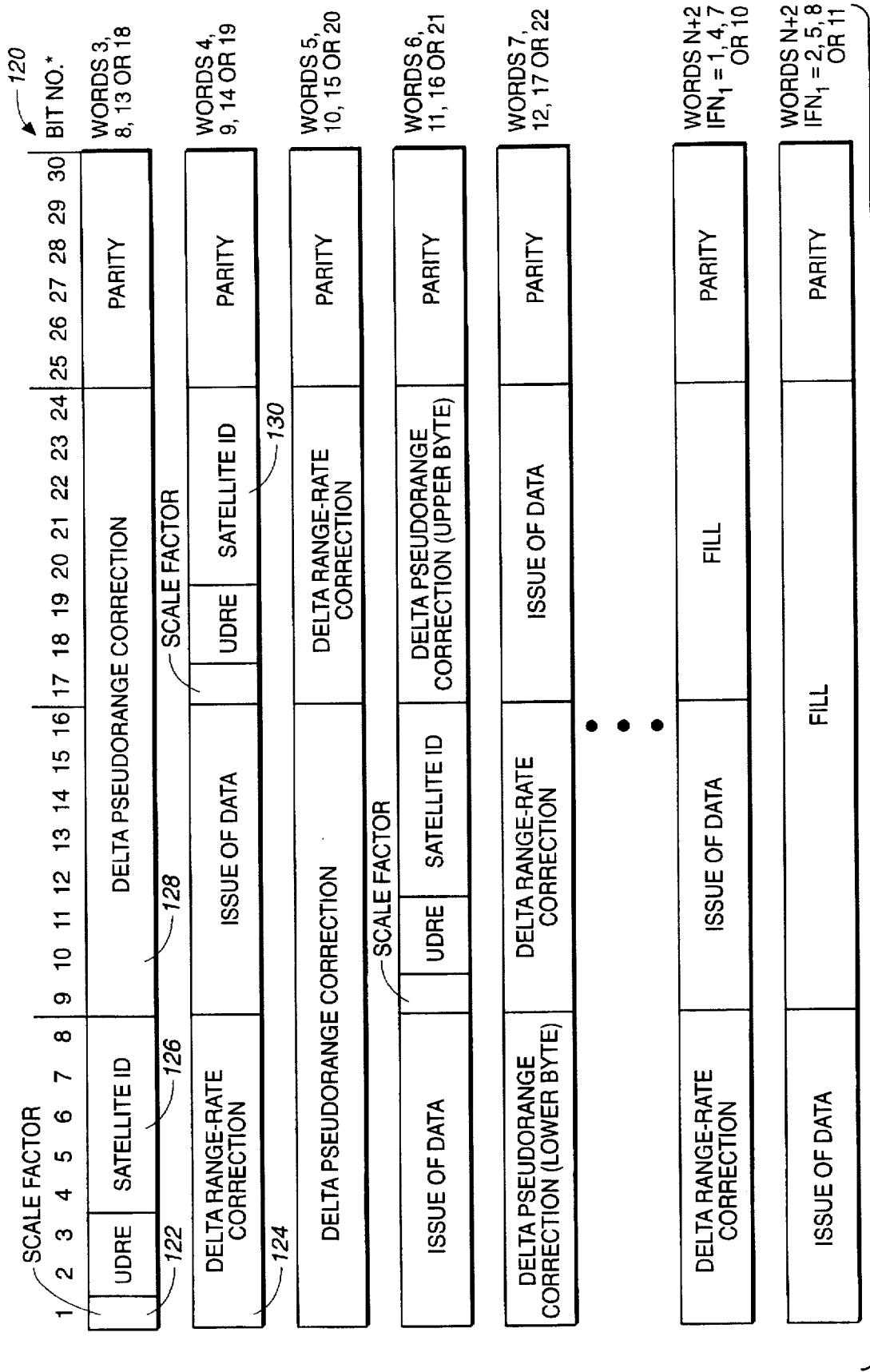
FIG._6

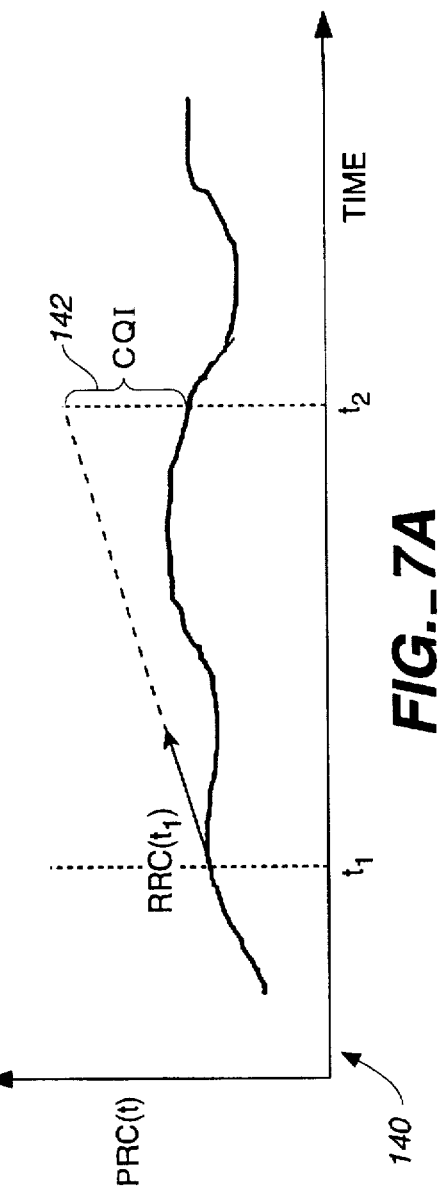
FIG._7A
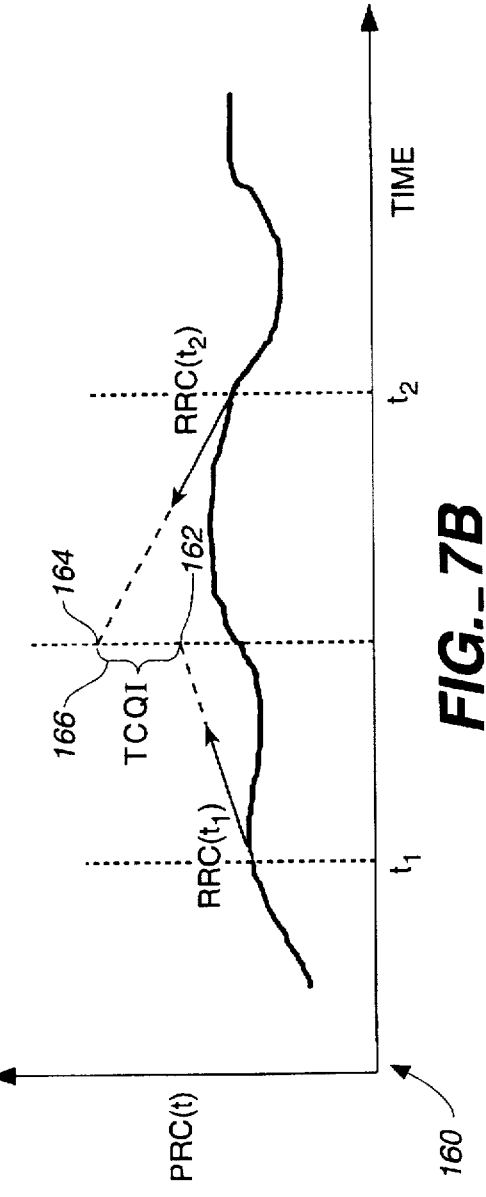
FIG._7B

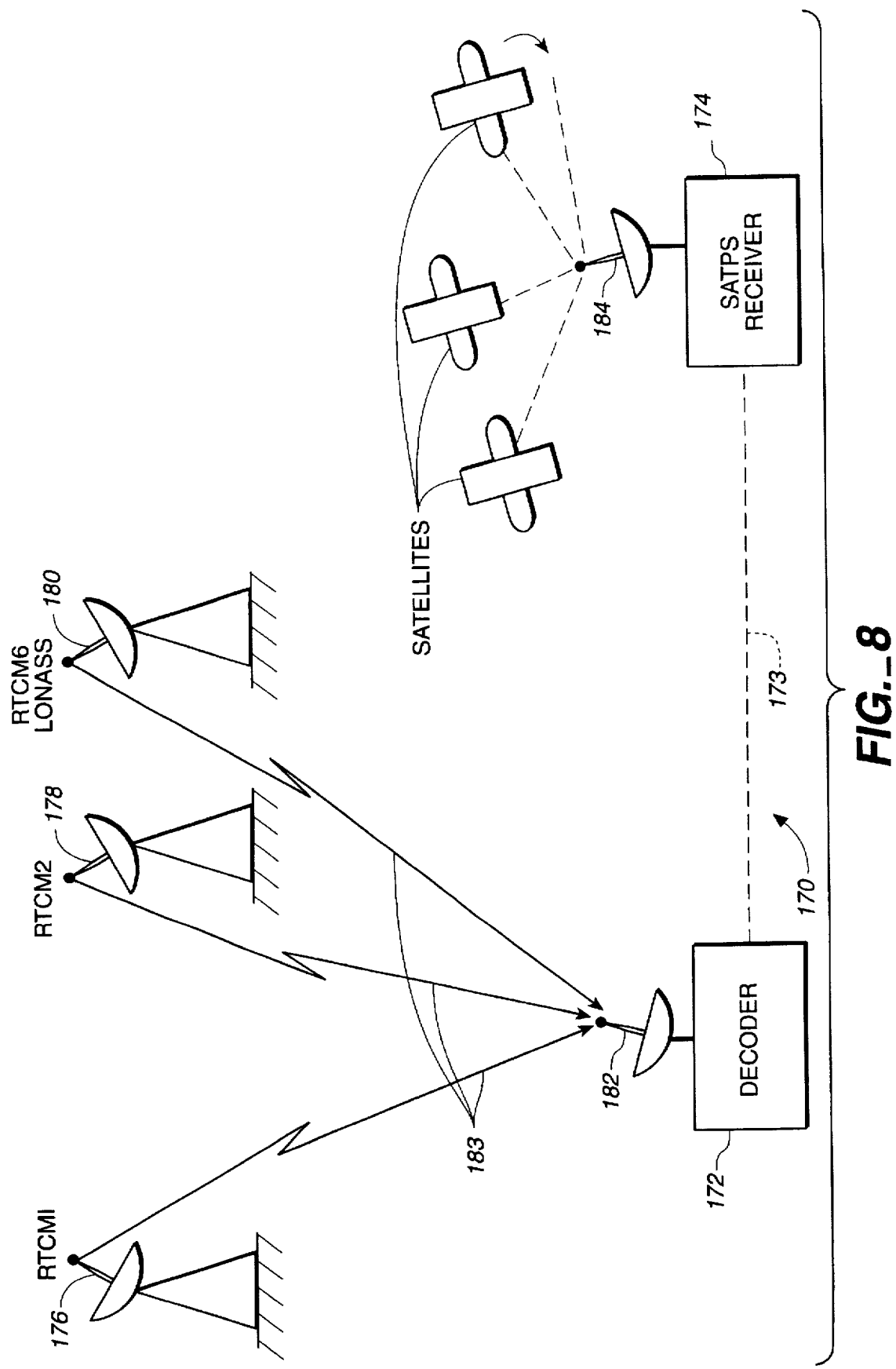
FIG._8

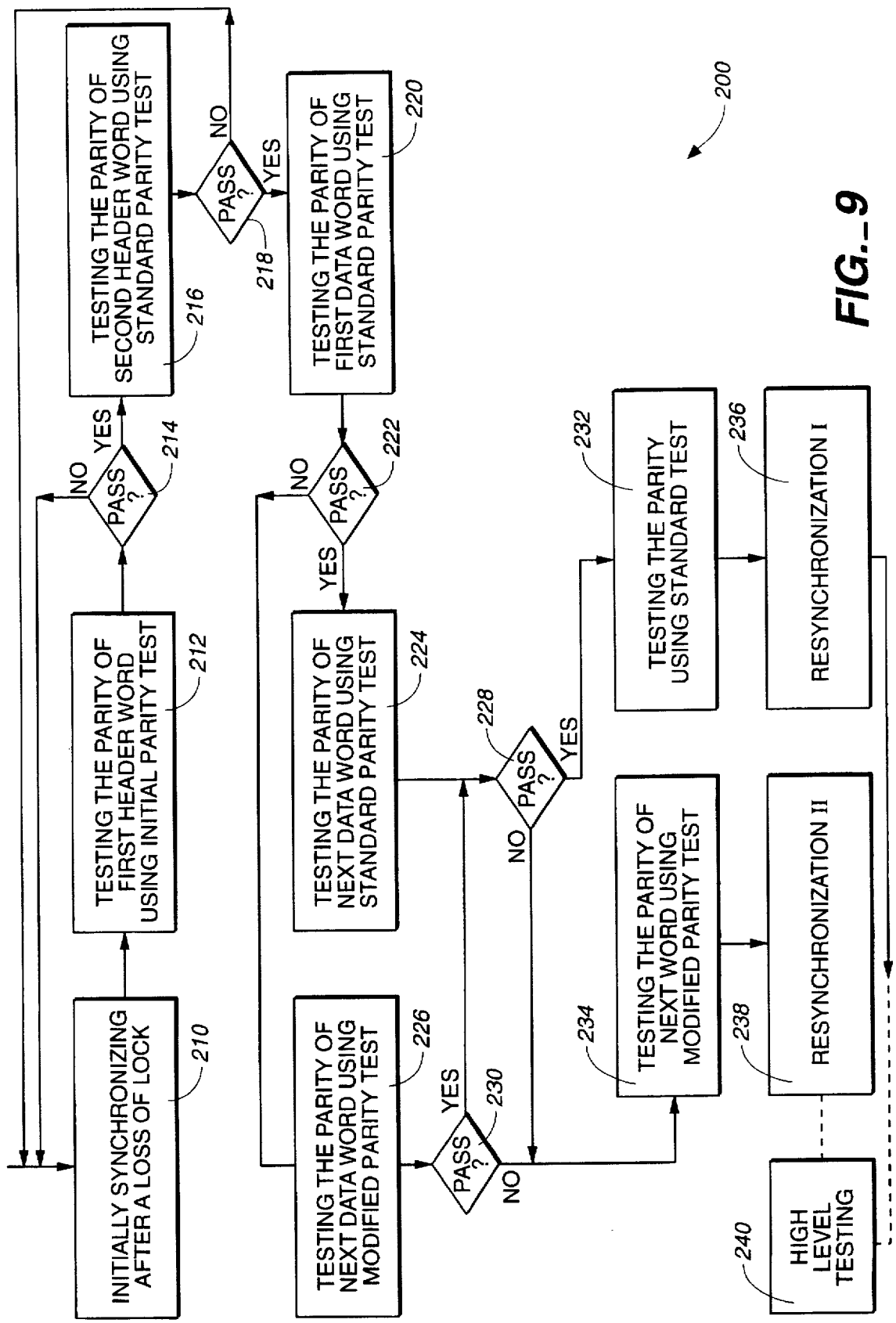
FIG._9

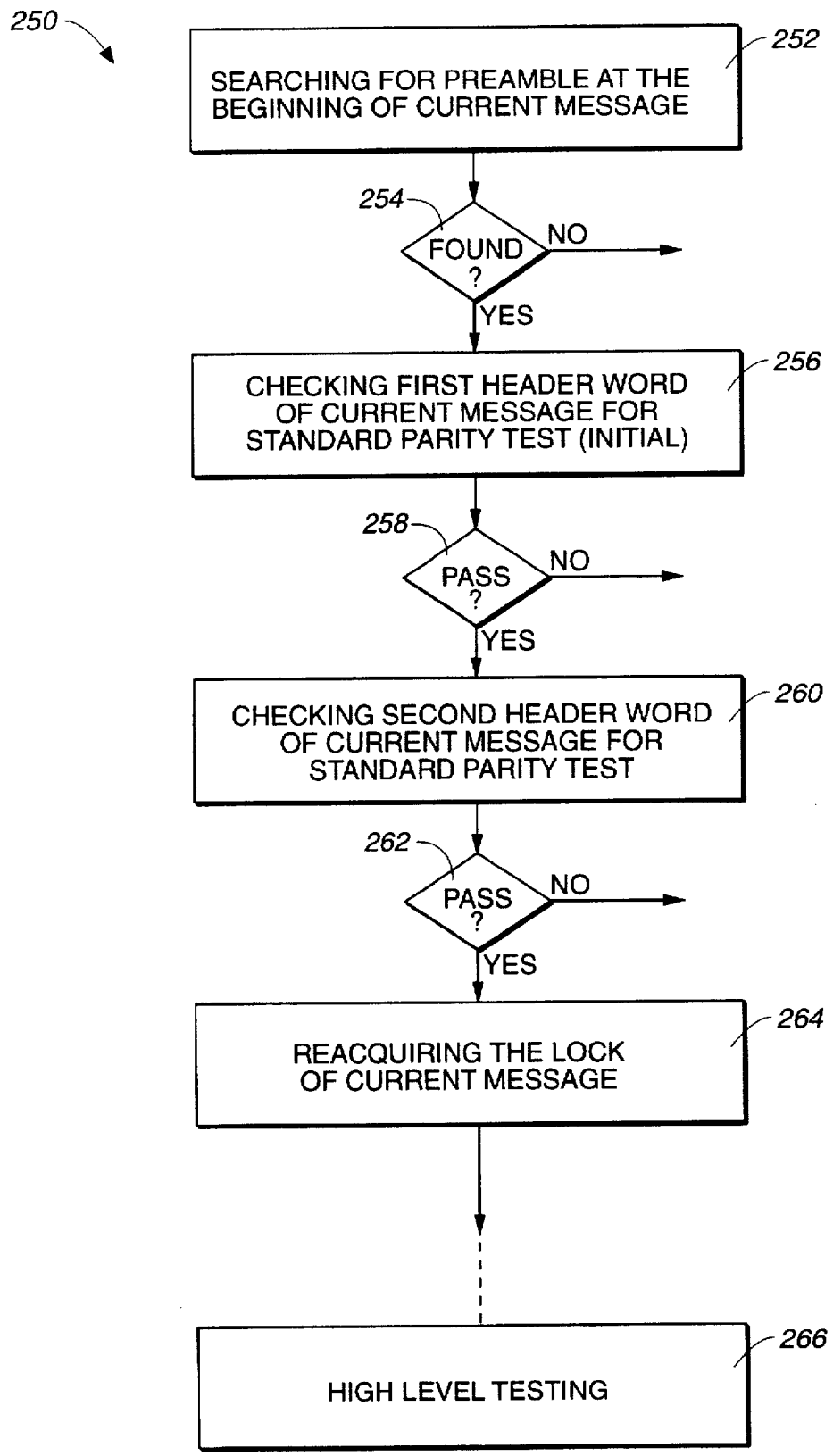
FIG._10

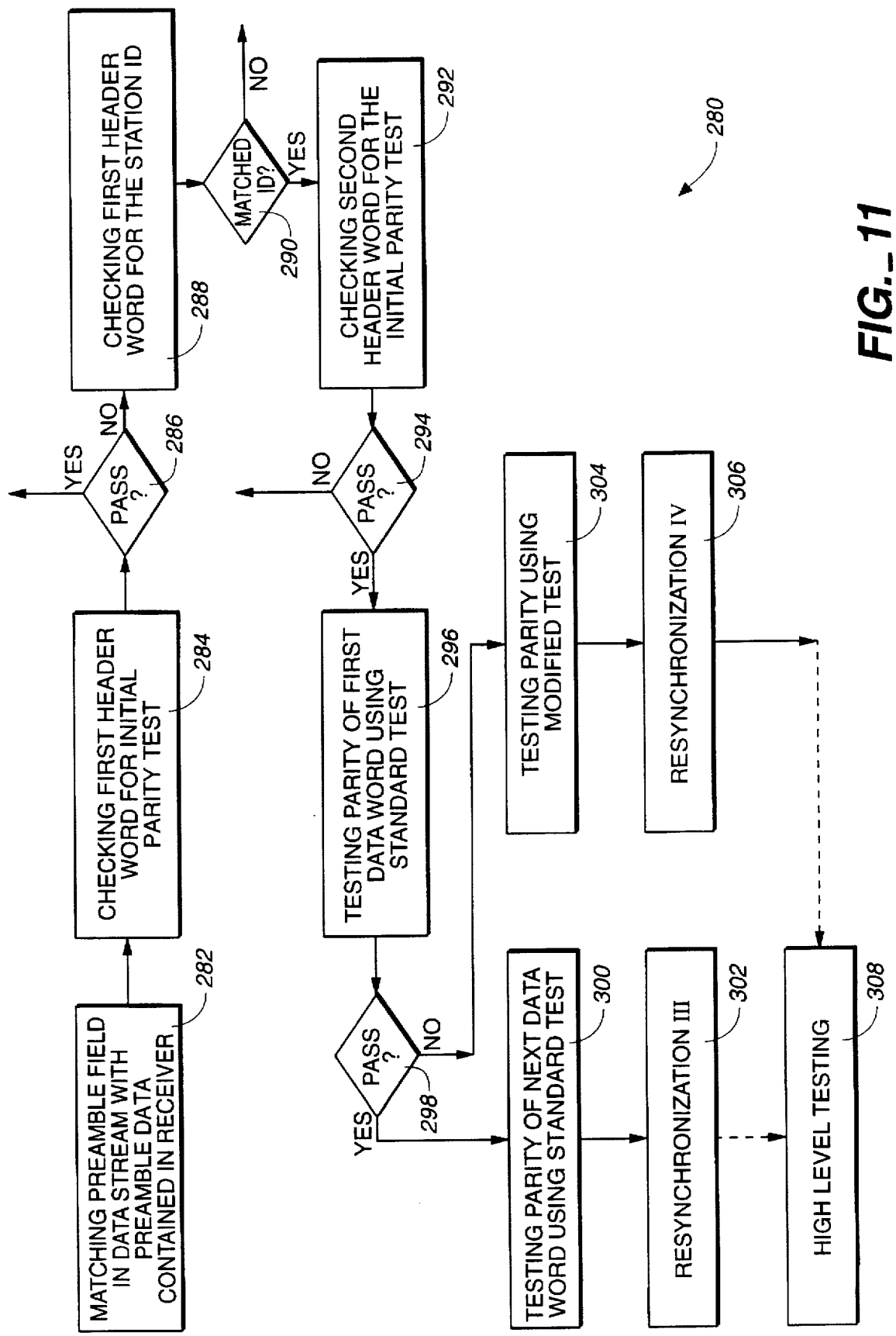
FIG._11

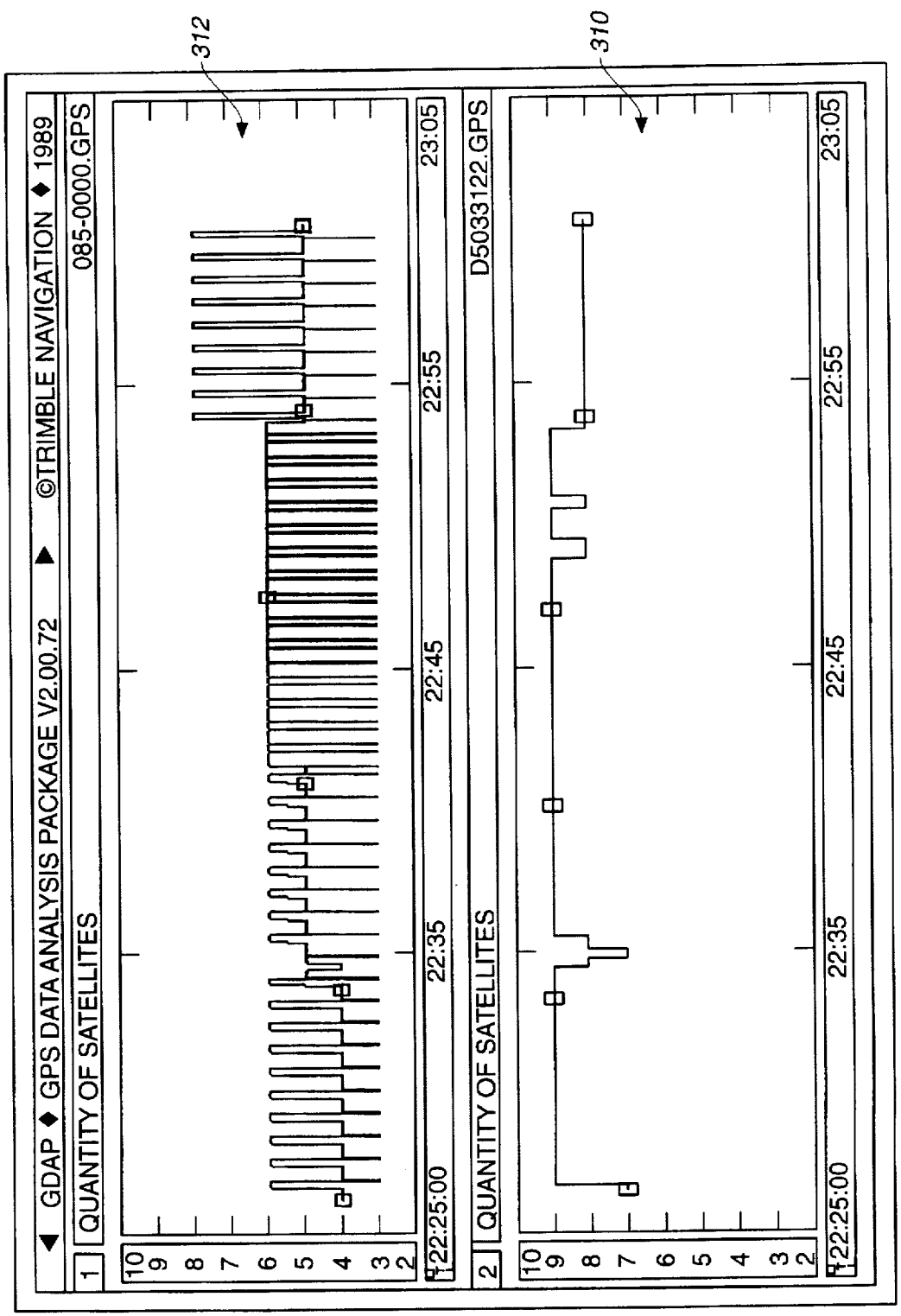
FIG._12

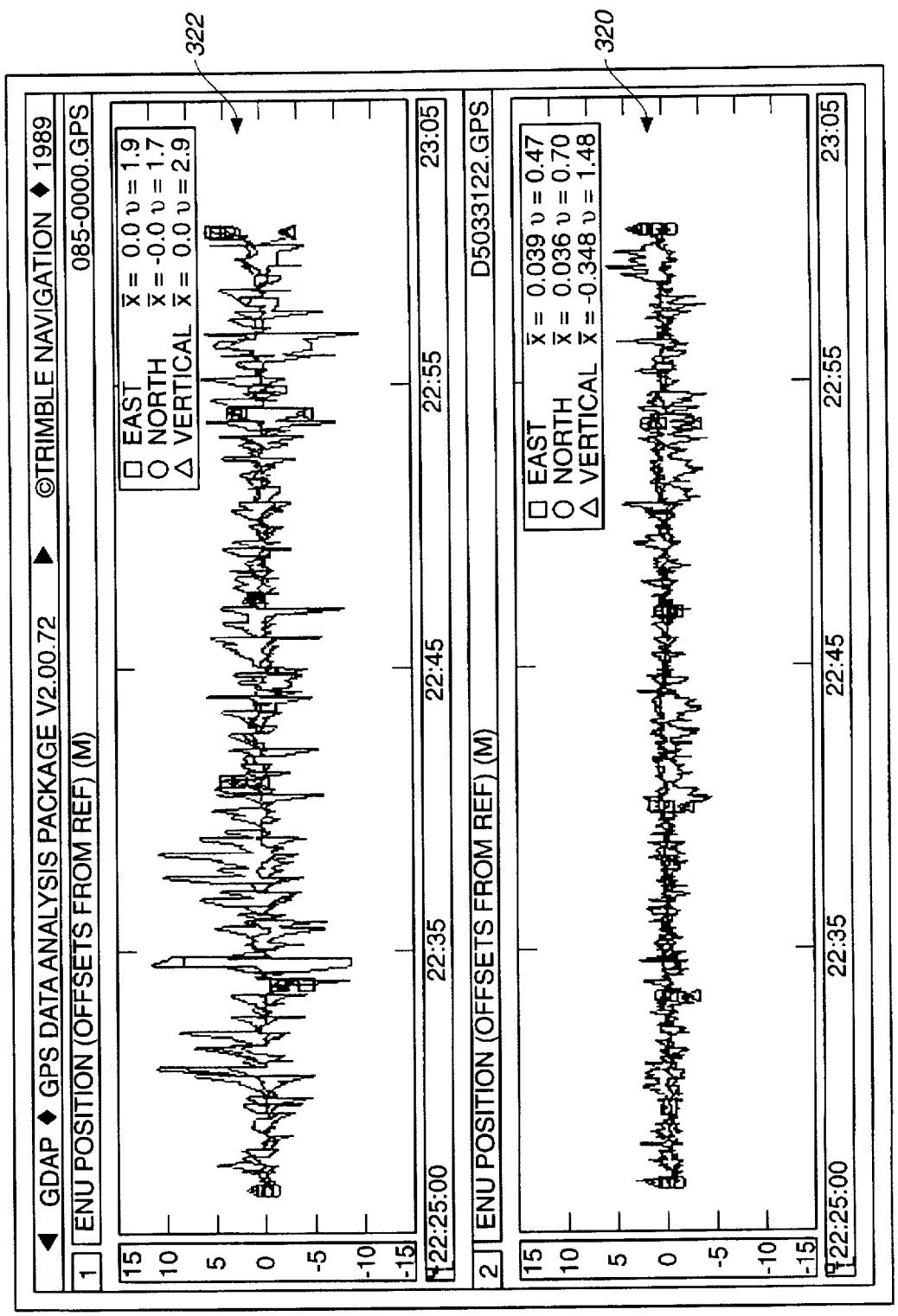
FIG._13

OPTIMUM UTILIZATION OF PSEUDORANGE AND RANGE RATE CORRECTIONS BY SATPS RECEIVER

BACKGROUND

The global positioning system (GPS) is a United States funded satellite system consisting of twenty-four satellites in a constellation that beams highly accurate timed signals to earth. There are other satellite systems which can be used for the same purposes. For instance, the GLONASS satellite system maintained by Russia also beams the accurately timed signals to earth. The generic term used for designation of any possible satellite positioning system is a satellite positioning system (SATPS).

SATPS receivers can process the satellite signals from anywhere in the world and provide a user with position information that can be accurate within twenty meters. Each SATPS satellite moves through a known orbit and the time that individual SATPS satellite transmissions take to reach a user position are used in solving a triangulation problem. The individual signal path from each satellite to the user's position must pass through the troposphere and ionosphere. Position solution errors can occur when there is not accurately accounted for radio signal propagation delays caused by the troposphere and ionosphere. The ionosphere introduces its maximum delays about 2:00 PM local time and has practically no effect at night. Thus, the local time may be important to a position solution. The troposphere can introduce delays that are a function of barometric pressure, temperature, humidity and other weather variables. Variations in the actual orbit of each SATPS satellite will also have an impact on position solution accuracy. Drifts in the clock of each SATPS satellite will also impact user position solution accuracy. Service bureaus and agencies have been established to sell or otherwise provide differential data. Such data range from real-time local information to sometimes very complex mathematical models based on long-term observations.

The following discussion specifically covers the GPS but is fully applicable for any other SATPS.

U.S. Government agencies issue orbit correction information on a satellite-by-satellite basis. Dual frequency carrier GPS receivers continuously track L1 and L2 carriers of a GPS satellite to generate accumulated delta-range (ADR) measurements, and at the same time track L1 C/A-code, and/or L1 P-code, and/or L2 P-code to generate code phase measurements. Each carrier is modulated with codes that leave the GPS satellite at the same clock time. Since the ionosphere produces different delays for a radio carrier passing through it having different radio frequencies, dual carrier receivers can be used to obtain real-time measurements of ionospheric delays at a user particular position. L1 is typically 1575.42 MHZ and L2 is typically 1227.6 MHZ. The L1 and L2 ADR measurements are combined to generate a new L1 ADR measurement that has an ionospheric delay of the same sign as the ionospheric delay in the L1 pseudorange. Accurate ionospheric delay values, if used in a position solution, can help produce much better position solutions. Without such real-time ionospheric delay, measurements taken by third parties must be used instead. The communication of this information to a user's site can be costly and require wide communications channel bandwidth.

Commercial and private users have been able to make use of GPS satellite signal transmissions even though they use the so-called "unauthorized" receivers. "Authorized" receivers are able to receive special information (P-code) that can remarkably improve position solution accuracy. Since an enemy could use GPS to fly and target missiles and artillery shells to better than one meter accuracy, the U.S. Department of Defense occasionally engages a Selective Availability (S/A) mode, spoofing and encryption of the GPS signals that deliberately introduce solution errors into user receivers that lack an authorization code needed to see through the masking. A codeless unauthorized GPS receiver is able to cross-correlate the L1 and L2 signals and extract enough information to measure the ionospheric delay.

With differential GPS, a stationary reference receiver is placed at a very accurately known point location. The reference receiver generates corrections which are sent to a transmitter, which in turn broadcasts the corrections to users within the area of the transmission broadcast. A differential GPS user receives these corrections through a radio/modem and applies them to the direct GPS measurements. This gives the user a position measurement of very high accuracy, e.g., from one meter to ten meters. Differential GPS works quite well to produce meter-level accurate navigation as far as 100 kilometers from the reference station. Most radiolocation and radionavigation systems can be operated in a differential mode, and consequently provide improved accuracy. The features of continuous service, high effective update rate, and potentially large coverage areas make it possible for differential GPS to provide "real-time" positional information that could be obtained previously only in a "post-processing" mode of operation. This combination of capabilities of differential GPS makes it very attractive for a variety of applications. As the price of receivers falls to the level of competing systems, many users will choose GPS. The differential GPS finds application in the Marine Navigation. Indeed, the ability of GPS/GLONASS to provide global coverage with an accuracy of 100 meters is expected to make it very attractive to ships that sail in international waters. Even without differential operation, the navigation service is adequate for oceanic and coastal marine operations. The Federal Radionavigation Plan (FRP) cites the requirements for oceanic and coastal navigation accuracy as 400 meters. However, in the restricted channels of some harbors and inland waterways 8–10 meters accuracy is required and the utilization of the differential GPS is essential to meet this requirement.

Inland waterway navigation, such as along the St. Lawrence Seaway, could benefit considerably from differential GPS service. In addition to providing guidance during periods of low visibility, it may prove possible to extend the period of safe passage by several weeks.

For Air Navigation, the Precision Landing requires highly accurate vertical guidance (0.4 meters, 2-sigma), as well as accurate lateral guidance (4–9 meters, 2-sigma) that may be achieved by employing the differential GPS system. Another application would be agricultural operations such as crop spraying that often takes place at night. The pilot flies close to the ground using flagmen to provide visual reference. Deferential GPS could provide the aircraft with accurate guidance along the desired tracks.

The differential GPS used in Land Navigation can provide a user with the capability to distinguish the particular home or building. The differential GPS can be used for Marine Surveying applications such as oil and natural gas exploration of the ocean floor. There are many phases to oil and gas exploration which require position fixes. They are: exploration, appraisal drilling, acoustic device positioning, field development, post-production, and geodetic control.

The land surveys by using the differential GPS systems can obtain real-time, high-accuracy position fixes, so that highway surveying, cadastral surveying, and geodetic surveying techniques can be greatly simplified.

The U.S. Census Bureau is interested in using the differential GPS technique to identify township and county boundaries, and to locate homes that are off identified roads or which do not have addresses. The accuracy requirement have been estimated as 5–50 meters.

However, there are some identifiable problems that became the subject of different patents in the field of differential navigation.

If in the differential GPS mode of operation a user receiver is moved away from a reference receiver, the corrected accuracy will gradually deteriorate. The accuracy degradation is approximately one centimeter of accuracy per kilometer of distance from the reference station.

Spradley et al., in U.S. Pat. No. 5,155,490, disclose an improved system and method for determining a receiver's position (or "fix") in space and time using the GPS satellite network signals. The GPS satellites transmit the PRN (pseudo-random) code, that is a very faint signal which hardly registers above the earth's natural background noise. The noise in PRN code signals is near-Gaussian noise. Instead of computing fixes based on comparatively short, interrupted satellite sessions, the system continuously collects data from as many satellites as possible at a number of geographically diverse base stations organized into a network and having highly accurate clock oscillators and high sampling rates. Statistical analysis of the resulting satellite data leads to accurate and precise measurements of base station clock errors. If the network of base stations is sufficiently diverse geographically, the system has also the ability to model refraction errors and atmospheric signal delays.

In U.S. Pat. No. 5,323,322 issued to Mueller, Loomis, Kalafus and Sheynblat, a superior worldwide network of differential GPS Reference Stations (NDGPS) is disclosed. The network of dGPS stations continually tracks the entire GPS satellite constellation and provides interpolations of reference station corrections tailored for particular user locations between the reference stations. An absolute pseudorange correction (PRC) is defined for each satellite as a function of a particular user location. A map of the function is constructed with "iso-PRC" contours. The network measures the PRCs at a few points, so called reference stations and constructs an iso-PRC map for each satellite. The data bandwidth are kept to a minimum by transmitting information that can not be obtained directly by the user and by updating information by classes and according to how quickly each class of data goes stale given the realities of the GPS system. Sub-decimeter-level kinematic accuracy over a given area is accomplished by establishing a mini-fiducial (fixed reference) network. The NDGPS system is able to compensate for the problem of separation between a corresponding reference station and user.

Differential corrections are determined by placing a GPS receiver at a precisely known, fixed reference site, and then measuring the actual errors by comparing the received pseudoranges with the values expected for the known reference site. The differences between the received and expected values are then transmitted to users over a separate communication link to correct their pseudorange measurements before the fix is computed. Some measurement errors are uncorrelated and can not be totally compensated for by the differential corrections. For example, atmospheric propagation delay errors and satellite position errors will vary as the separation distance from the reference site increases and therefore will not be common to all measurements. A method of reducing the sensitivity of the user fix computation to residual error must also be employed in addition to differential correction.

Sensitivity to residual error depends on the satellite locations with respect to the user location and the consequent mathematical relationship between basic pseudorange measurement errors and the position computation. This mathematical relationship is called the Position Dilution of Precision (PDOP). PDOP is primarily a scaler multiplier that allows the user to estimate fix uncertainty for a given measurement uncertainty. For example, if the measurement error is ±10 meters and the PDOP is 3, the user can expect a fix error (i.e., error in calculated position) of ±30 meters in a statistical sense. See "Geometric Formulas for Dilution of Precision Calculations", by Paul Messeti and Karl Rudnick in Vol. 37., No. 4 at page 379 of the *Journal of the Institute of Navigation*.

GPS satellite locations are constantly changing as the satellites move across the sky and so the PDOP also constantly changes regardless of whether the user is stationary. Minimum PDOP occurs when all satellites are uniformly distributed across the sky seen by the user but this does not occur all the time. Users sometimes experience very large PDOP, especially when the satellites become "grouped together", and fix errors correspondingly fluctuate.

Dennis, in U.S. Pat. No. 5,365,447, discloses a satellite-based navigation system providing improved accuracy and reliability over wide geographical areas, including remote regions, thus minimizing PDOP variations in obtaining positional coordinates. The invention improves the accuracy and reliability of satellite-based navigation by computing in its preferred embodiment measurements derived from GPS and commercial geostationary satellite systems in the position computation. Differential corrections are determined for both GPS and geostationary satellite signals and transmitted to the user. The use of geostationary satellites provides enhanced coverage and accuracy over the use of GPS alone since the signals emanate from stationary points rather than from moving satellites that rise and fall.

There is also a general problem relating to all differential GPS receivers that is addressed in the present invention. The differences between the received and expected values are transmitted from the Reference Station to the GPS receiver over a separate communication link to correct the GPS receiver pseudorange measurements before the fix is computed. During atmospheric noise, lightning, storms, weather anomalies, or electromagnetic interference, the messages transmitted from the Reference Station to the GPS receiver can be damaged. Also, some differential GPS systems do not allow the use of error correction codes to correct the data errors resulting from the imperfect data transmission from the Reference Station to the GPS receiver. For instance, the Radio Technical Commission for Maritime Services (RTCM) does not recommend the use of a the self-correction code because it would increase the bandwidth required for the transmission. What is needed is a correction algorithm and an apparatus employing an algorithm which would allow the differential GPS receiver to process the damaged messages as well as the undamaged messages.

SUMMARY

The present invention is unique because it introduces the algorithm and an apparatus that employs this algorithm that allows to process the damaged messages as well as the undamaged messages.

The first aspect of the present invention is directed to a method of checking a partially damaged message being transmitted from a base to a rover using a parity mechanism. The method is used by a differential satellite positioning system (DSATPS) and allows to recover data contained in the damaged message. Each message includes a plurality of words including a header, and a plurality of data words following the header. The header includes a first header word and a second header word. The first header word includes a specific PREAMBLE field, wherein the first header word indicates the start of a new message; and wherein the second header word provides the message frame length information. Each header word includes n bits including m parity bits; each data word includes n bits including m parity bits; n and m are integers. The method comprises the following steps: (1) sysynchronizing after a loss of lock the message, wherein the first header word of the message including the specific PREAMBLE field is employed for identifying the received information as the current message; (2) testing the parity of the first header word of the message frame using the initial parity test; (3) testing the parity of the second header word of the message frame using the standard parity test when the first header word passes the initial parity test; (4) testing the parity of the first data word of the message frame using the standard parity test when the second header word passes the standard parity test; (5) designating as a "hit" word the first data word if the first data word fails the standard parity test and designating as a "pass" word the first data word if the first data word passes the standard parity test; (6) testing the parity of each data word following the "hit" data word using the modified parity test and testing the parity of each data word following the "pass" data word using the standard parity test; (7) starting the resynchronization process by searching for the PREAMBLE at the beginning of the current message if the last data word of the preceding message is a "hit" data word; the first header word of the current message is checked for the initial parity test that does not require the knowledge of the last two bits d29* and d30* of the last "hit" data word of the preceding message, and wherein the last two bits d29* and d30* of the last "hit" data word of the preceding message are both assumed to be zeroes; and the second header word of the current message is checked for the standard parity test; and wherein the lock of the current message is reacquired if the PREAMBLE in the first header word of the current message is found, and the first header word of the current message passes the initial parity test, and the second header word of said current message passes the standard parity test; (8) starting the resynchronization process by searching for the PREAMBLE at the beginning of the current message if the last data word of the preceding message is a "pass" data word, the first header word and the second word of the current message are checked for the standard parity test, wherein the standard parity test employs the known last two bits d29* and d30* of the last "pass" data word of the preceding message when first header word of the current message is tested, and wherein the standard parity test employs the known last two bits d29* and d30* of the first header word of the current message when the second header word of the current message is tested, and wherein the lock of the current message is reacquired if the PREAMBLE in the first header word of the current message is found, and the first header word of the current message passes the standard parity test, and the second header word of the current message passes the standard parity test; and (9) assigning the "pass" or "fail" grade for each header word and each data word, wherein the record of all "pass" and "fail" words is used for the higher level testing of the differential corrections.

Another aspect of the present invention is directed to one more method of checking a partially damaged message using a parity mechanism. This method comprises the following steps: (1) matching the PREAMBLE field in the data stream with the PREAMBLE data contained in the user receiver; (2) checking the first header word for the initial parity test; (3) checking the first header word for the station ID if the first header word does not pass the initial parity test; (4) checking the second header word for the initial parity test if the first header word does not pass the initial parity test and if the station ID contained in the message matches with the station ID contained in the user receiver; (5) acquiring the lock if the second header word passes the initial parity test and if the station ID contained in the current message matches with the station ID contained in the user receiver; (6) testing the parity of each current data word of the message using the standard parity test; (7) designating as a "hit" word the first data word that fails the standard parity test and designating as a "pass" word the first data word that passes the standard parity test; (8) testing the parity of each data word following the "hit" data word using the modified parity test and testing the parity of each data word following the "pass" data word using the standard parity test; (9) starting the resynchronization process by searching for the PREAMBLE at the beginning of the current message, checking the first header word and the second word of current message for the initial parity test that does not require the knowledge of the last two bits d29* and d30* of the last data word of the preceding message; checking the first header word for the station ID; and reacquiring the lock if the PREAMBLE in the first header word of the current message is found, and if the station ID contained in the message matches with the station ID contained in the user receiver, and if the first header word of the current message doesn't pass the initial parity test, and the second header word of the current message passes the initial parity test that does not require the knowledge of the last two bits d29* and d30* of the first header word of the current message; and (10) assigning the "pass" or "fail" grade for each header word and for each data word, wherein the record of all "pass" and "fail" words is used for the higher level testing of the differential corrections.

The step of checking the first header word for the station ID can further include the step of entering the station ID by the user, or the step of storing the previously received station ID.

In one embodiment, the message generated by a Reference Station (RefSta) and received by the SATPS receiver can be an RTCM1 message, wherein the step of synchronizing the RTCM1 message further includes the step of matching the PREAMBLE 1 field in the data stream with the PREAMBLE 1 data contained in the user receiver. In another embodiment, the message generated by a Reference Station (RefSta) and received by the SATPS receiver can be an RTCM2 message, wherein the step of synchronizing the RTCM2 message further includes the step of matching the PREAMBLE 2 field in the data stream with the PREAMBLE 2 data contained in the user receiver. Yet, in one more embodiment, the message generated by a Reference Station (RefSta) and received by the SATPS receiver can be a GLONASS RTCM message, wherein the step of synchronizing the GLONASS RTCM message further includes the step of matching the PREAMBLEg field in the data stream with the PREAMBLEg data contained in the user receiver.

Each message consists of 30-bit words numbered 1, 2, . . . . M, wherein each 30-bit word consists of d1, d2, . . . d24, d25, d26, . . . d29, d30 bits, d25 through d30 are the parity bits, wherein bits d29* and d30* indicate the last two bits of the parity bits of the previous word.

The standard parity test includes the steps of: (1) computing the checksum based on d29*, d30* and d1 through d24; and (2) checking the checksum for the match with the parity bits contained in the bits d25 through d30; wherein if there is a match the standard parity test has been passed, and wherein the standard parity test has been failed if there is no match.

The initial parity test comprises the following steps: (1) assuming that d29* and d30* bits are both zeroes; (2) making the direct comparison of d1 through d8 bits to the PREAMBLE stored in the user receiver; (3) setting d30* to a one, inverting data bits d1 through d8, inverting the stored PREAMBLE, and making the inverted comparison of the inverted data bits d1 through d8 to the inverted PREAMBLE if the direct comparison fails; (4) computing the checksum based on d29*, d30* and d1 through d24 if either direct or inverted comparison does not fail; (5) checking the checksum for the match with the parity bits contained in the bits d25 through d30; and (6) recomputing the checksum based on d29*, d30* and d1 through d24 by setting d29* to a one if the match is not found and checking the checksum for the match again.

The modified parity test further includes the steps of: (1) modifying a "hit" word by changing the last two bits of that "hit" word; wherein the current word immediately follows the "hit" word; wherein the last two bits of the "hit" word have four different sates; and wherein the first state is a "0" state for the last but one bit d29*; and a "0" state for the last bit d30*; and wherein the second state is a "0" state for the last but one bit d29*, and a "1" state for the last bit d30*; and wherein the third state is a "1" state for the last but one bit d29*, and a "0" state for the last bit d30*; and wherein the fourth state is a "1" state for the last but one bit d29*, and a "1" state for the last bit d30*. For the first of these four embodiments of the "hit" word the checksum based on d29* and d30* and d1 through d24 is computed and matched with the parity bits d25 through d30. If there is no match for the first embodiment, the checksum based on d29* and d30* and d1 through d24 is computed and matched with the parity bits d25 through d30 for the second of these four embodiments of the "hit" word. If there is no match for the second embodiment, the same procedure is repeated for the third embodiment. If there is no match for the third embodiment, for the forth embodiment the same procedure is repeated. If for any of four embodiments there is a match the modified parity test has been passed, and wherein if for all four embodiments there is no match the modified parity test has been failed.

Yet, one more aspect of the present invention is directed to a method of high level testing of the differential corrections. The high level test measures the Correction Quality Indicator (CQI), and is based on the information contained in the current pseudorange correction (PRC), in the current range rate correction (RRC), and in the previous PRC projected to a current time tag; and wherein t1 is synchronized with the Modified Z-Count for a PRC which was generated at t1; and wherein t2 is the Modified Z-Count of the current correction received for that satellite; and wherein the Modified Z-Count is defined as the time of the start of the frame as well as the reference time for the message parameters; and wherein the Modified Z-Count provides the time into the hour (0 through 3599.4 seconds) and is sent in units of 0.6 seconds. The method comprises the steps of: (1) computing $CQI=PRC_{r2}-[PRC_{r1}+RRC_{r1}*(t2-t1)]$; and (2) comparing the computed CQI value with the threshold value T(FAR); wherein the T(FAR) is the threshold value based on a false alarm rate and confidence interval, and wherein if the CQI exceeds the threshold value T(FAR) then a failure is declared and the corrections for the tested satellite or a combination of tested satellites are marked as invalid for further use in the user receiver differential solution.

Yet, another aspect of the present invention is directed to a method of high level testing of the differential corrections, wherein the test measures the Trimble Correction Quality Indicator (TCQI). The test is based on the information contained in the current pseudorange corrections (PRC) and in the current range rate correction (RRC) projected backward to some time $t3=(t1+t2)/2$; and wherein the test is also based on the information contained in the previous PRC and RRC projected forward to the time t3; and wherein t1 is synchronized with the Modified Z-Count for a PRC which was generated at t1; and wherein t2 is the Modified Z-Count of the current correction received for that satellite; and wherein the Modified Z-Count is defined as the time of the start of the frame as well as the reference time for the message parameters; and wherein the Modified Z-Count provides the time into the hour (0 through 3599.4 seconds) and is sent in units of 0.6 seconds; and wherein TCQI is valid in the middle t3 of the interval defined by the Modified Z-Counts t2 and t1; and wherein the method uses all of the correction data contained in two consecutive messages for a particular satellite; and wherein the TCQI can be defined at any instant (tn) between t1 and t2. The method comprises the steps of: (1) computing a TCQI value: $TCQI=PRC_{r2}-RRC_{r2}*(t2-t1)/2-[PRC_{r1}+RRC_{r1}*(t2-t1)/2]$; and (2) comparing the computed TCQI value with the threshold value T(FAR); wherein the T(FAR) is the threshold value based on a false alarm rate and confidence interval, and wherein if the TCQI exceeds the threshold value T(FAR) then a failure is declared and the corrections for the tested satellite or a combination of tested satellites are marked as invalid for further use in the user receiver differential solution.

Additional aspect of the present invention is directed to an apparatus for partial decoding the damaged messages in the differential mode of operation of a Reference Station (RefSta), wherein the RefSta generates differential messages and transmits them to the remote user. The apparatus comprises at least one partial message decoder for decoding the encoded data transmitted by the RefSta, a differential satellite positioning system (SATPS) receiver, wherein the SATPS receiver receives the raw positioning data from the SATPS and receives the partially decoded differential corrections from at least one partial message decoder for improving the raw positioning data transmitted by the SATPS; and a communication link connecting at least one partial message decoder and the SATPS receiver. In one embodiment, the RefSta can transmit an RTCM1 message and the partial message decoder includes a partial RTCM1 decoder. In another embodiment, the RefSta transmits an RTCM2 message and the partial message decoder comprises a partial RTCM2 decoder. In one more embodiment, the RefSta transmits a GLONASS RTCM message, and the partial message decoder further includes a partial GLONASS decoder.

The communication link can include a wire link or a wireless link. The wireless communication link can include a cellular telephone, a radio, a satellite communication link, a wireless WAN/LAN station, or a wireless application services.

BRIEF DESCRIPTION OF THE DRAWINGS

FIG. 1 illustrates the differential GPS geometry.

FIG. 2 depicts a Reference Station block diagram.

FIG. 3 shows a user equipment block diagram.

FIG. 4 is an illustration of a 2-word header for all messages.

FIG. 5 shows a type 1 message format.

FIG. 6 is a depiction of a type 2 message format.

FIG. 7A is a graphical illustration of the Correction Quality Indicator (CQI).

FIG. 7B is a depiction of the Trimble Correction Quality Indicator (TCQI).

FIG. 8 shows a message decoder combined with a GPS receiver which is able to receive the differential corrections from multiple Reference Stations.

FIG. 9 depicts the flow chart for the partial parity algorithm in the preferred embodiment.

FIG. 10 illustrates the flow chart of the resynchronization process.

FIG. 11 is a depiction of a flow chart for the partial parity algorithm in the second preferred embodiment.

FIG. 12 shows the quantity of satellites used in the user receiver position fix.

FIG. 13 illustrates the computed errors in the user position fix.

FULL DESCRIPTION OF THE PREFERRED EMBODIMENT

FIG. 1 illustrates the differential GPS geometry 10. The satellites 12, 14, 16, and 18 provide the satellite signals which are received by the differential Reference Station (RefSta) 20 and by the user receiver 22. The datalink 24 allows to transmit the differential corrections to the user that can calculate its position location with an improved accuracy. FIG. 2 depicts the block diagram 30 of the RefSta. The RefSta consists of a GPS receiver 36 with antenna 34, a data processor 38, a data link transmitter 44 with antenna 46, and interfacing equipment like data formatter 40 and modulator 42. The GPS receiver is carefully surveyed to determine its phase center position. The ideal RefSta receiver 36 has 12 parallel channels that allow to continuously receive signals from all satellites in view.

The user equipment is shown in FIG. 3. It consists of a GPS receiver 56 with antenna 54, a data processor 58, a data link receiver 64 with antenna 52, and interfacing equipment. The data processor applies the corrections received from the RefSta to the pseudorange and pseudorange rate data measured by the receiver.

For each satellite employed by the user receiver, the correction obtained from the RefSta is added to the pseudorange measurement. The pseudorange correction itself is derived from the pseudorange and range rate corrections, adjusted to account for the time elapsed between the time of reception of the corrections and the time of the user pseudorange measurement, as follows:

$$PRC(t)=PRC(t(0))+(RRC(t(0))*(t-t(0)));$$

where PRC(t) is the correction to be applied, PRC(t(0)) is the pseudorange correction from the message, RRC(t(0)) is the range-rate correction from the message, t(0) is the reference time of the correction, and t is the time associated with the pseudorange measurement.

In the differential mode of operation a Reference Station (RefSta) generates the differential messages and transmits them to the remote user. The following discussion is applicable to all differential message formats with the emphasis on the Radio Technical Commission for Maritime Services (RTCM) Special Committee No. 104.

To date there are 6 of possible 64 message types defined, either tentatively or in final fixed form, retired or reserved. See RTCM Recommended Standards for Differential NAVSTAR GPS Service, Version 2.1, Published in Jan. 3, 1994 by RTCM, 655 Fifteenth St, NW, Suite 300, Washington, D.C. 20005, USA, that is incorporated herein by reference. The RTCM SC-104 standard defines the message formats and recommends on the user interface, which allows a receiver to be used with a satellite or a radiobeacon link.

Message 1 transmits the differential GPS Corrections, message 2-Delta differential GPS Corrections, message 3-RefSta parameters, message 4-Surveying, message 5-Constellation Health, message 6-Null Frame, message 9-High Rate differential GPS Corrections, and so on. The messages are transmitted continuously with Message Type 6, Null Frame, used as a transmission fill, if the Reference Station has no other messages ready to send.

The general message format 70 is illustrated in FIG. 4 with details of the first two thirty-bit words of each frame or message type. Each frame is N+2 words long, N is an integer, N words containing the data of the message. The word size and parity algorithm are identical to that of the GPS navigation message as described in the document ICD-GPS-200 (NAVSTAR GPS/JPO, 1983, which is incorporated herein by reference.

Thus, the RTCM message format has 30 bit words (fixed size for GPS/GLONASS) (24 data and 6 parity bits) and utilizes GPS message parity algorithm. The RTCM message format, however, includes the variable frame length differential message format, whereas the GPS/GLONASS data format has fixed length subframes.

Each message comprises a two-word header followed by the data words. The message length varies with the message type as well as within the message type. Assuming 2 words per satellite (for Message Types 18 through 21) and a 24 satellite GPS constellation, the maximum message length comes to 50 words.

The first two words of each message contain data that is pertinent to any type of message: Reference Station ID information 80, time of message in Modified Z-Count 84, and PREAMBLE information required for message synchronization. The Modified Z-Count is different from the GPS Z-Count in that the least significant bit (LSB) has a scale factor of 0.6 seconds instead of 6 seconds, to account for the variable length frames, and the range of the Z-count is only one hour in order to conserve bits. The reasoning behind this is that all differential GPS users will have already initialized via the GPS system and will know what the GPS time is.

Message synchronization is achieved by user searching for a fixed 8-bit PREAMBLE 76 (identical to GPS) in the beginning of the first word 72. For instance, the RTCM Version 2.1 PREAMBLE is defined as 66 Hex ($102_{10}$).

Once the PREAMBLE is encountered, the decoding algorithm checks the parity of the first header word. If the first header word fails the parity test, it is assumed that the PREAMBLE bits were encountered by chance, and the search continues. For any algorithm to proceed with message decoding, the very first word of any message has to pass the parity test. The second header word also must pass the parity check, because it provides the length of message, which is important for partial decode rule.

FIG. 5 depicts type 1 message format that carries the differential corrections. This is the primary message type which provides the pseudorange correction PRC(t) for any time "t":

$$PRC(t)=PRC(t(0))+(RRC(t(0)))*(t-t(0)));$$

where PRC(t(0)) is the 16 bit pseudorange correction, RRC (t(0)) is the 8-bit rate of change of the pseudorange correction (range rate correction), and t(0) is the 13-bit modified Z-Count of the second word. The pseudorange measured by the user (PRM(t)) is then corrected as follows:

$$PR(t)=PRM(t)+PRC(t);$$

where PR(t) is the differentially corrected pseudorange measurement that should be processed by the user equipment navigation filter.

The data transmitted for any single satellite is spread through two data words. Thus, for the type 1 message data corresponding to the satellite No. 1 (106) is carried by the first data word 102 and by the part of the second data word 104, wherein the data sent for the satellite No. 2 (108) starts in the second data word 104 (see FIG. 5). The same is true for the message type 2 that carries the delta differential corrections (see FIG. 6) and message type 9.

The message transmitted from the RefSta to a GPS/GLONASS user can get hit during transmission because of atmospheric noise, lightning, storms, other weather anomalies, or electromagnetic interference. The self-corrected codes are not allowed to be used by some differential GPS systems. For instance, the Radio Technical Commission for Maritime services (RTCM) doesn't recommend the use of a self-correction code because it would increase the bandwidth required for the transmission. Thus, there is a need to develop the partial decode algorithm that would allow to salvage at least some information contained in the hit message.

Provided that the RefSta is generating differential pseudorange corrections PRCs and range rate corrections RRCs that are independent of the set of satellites used in the correction computation process (i.e., corrections do not "step" or "jump" when the satellite constellation switches), the partial decode algorithm can be applied at the remote station receiving differential corrections. The partial decode algorithm describes a method of checking a partially damaged message using a parity mechanism. This algorithm can be used by a differential satellite positioning system (DSATPS), wherein the partially damaged message is received by a rover. The method allows to recover data contained in the damaged message. Each message includes a plurality of words; including a header and a plurality of data words following the header. The header includes a first header word and a second header word, wherein the first header word includes a specific PREAMBLE field; and wherein the second header word provides the message frame length information.

The flow chart depicted in FIG. 9 describes the partial decoding algorithm in the preferred embodiment 200. During the initial message frame synchronization or resynchronization after a loss of lock (step 210), the specific PREAMBLE field contained in the first header word of the current message is matched against the PREAMBLE field contained in the user receiver. The received message can include an RTCM1 message, an RTCM2 message, or an RTCMg (GLONASS) message. The match identifies the received information as the specific message to be locked on.

After the lock is made, the next step of the algorithm 212 indicates that the first header word must pass the parity check using the initial parity test. As it was mentioned above, each message consists of 30-bit words numbered 1, 2, . . . M, (M is an integer), wherein each 30-bit word consists of d1, d2, . . . d24, d25, d26, . . . d29, d30 bits. The bits d25 through d30 are the parity bits. The bits d29* and d30* indicate the last two parity bits of the previous word. The initial parity test includes the following steps. At first, assuming that d29* and d30* bits are both zeroes, the direct comparison of d1 through d8 bits to the PREAMBLE stored in the user receiver is made. The next step is setting d30* to a one, inverting data bits d1 through d8, inverting the stored in the user receiver PREAMBLE, and making the inverted comparison of the inverted data bits d1 through d8 to the inverted PREAMBLE if the direct comparison fails. After that, the checksum based on d29*, d30* and d1 through d24 is computed if either direct or inverted comparison does not fail. The checksum is matched with the parity bits contained in the bits d25 through d30. If the match is not found, the checksum is recomputed based on d29*, d30* and d1 through d24 by setting d29* to a one, and the recomputed checksum is checked for the match again.

If the first header word passes the initial parity test (step 214), the second header word is tested using the standard parity test (step 216). The second header word provides the frame length information which is vital for the partial decode algorithm. If the second header word passes the standard parity test 218, every data word being received is tested for the parity failure using the standard parity test (step 220). If the data word passes the test, the "pass" is recorded. If a failure occurs, a "hit" is recorded for future processing.

The standard parity test includes the following steps. The checksum is computed based on d29*, d30* and d1 through d24; and the checksum is checked for the match with the parity bits contained in the bits d25 through d30; wherein if there is a match the standard parity test has been passed, and wherein the standard parity test has been failed if there is no match.

The parity of each data word following the "pass" data word is tested using the standard parity test (step 232). The parity of the current data word that immediately follows the "hit" word is tested using the modified parity test (step 234). The modified parity test includes modifying a "hit" word by changing the last two bits of the "hit" word, wherein the last two bits of the "hit" word have four different states. The first state is a "0" state for the last but one bit d29*; and a "0" state for the last bit d30*. The second state is a "0" state for the last but one bit d29*, and a "1" state for the last bit d30*. The third state is a "1" state for the last but one bit d29*, and a "0" state for the last bit d30*, wherein the fourth state is a "1" state for the last but one bit d29*, and a "1" state for the last bit d30*. For the first of these four embodiments of the "hit" word the checksum based on d294* and d30* and d1 through d24 is computed and matched with the parity bits d25 through d30. If there is no match for the first embodiment, the checksum based on d29* and d30 and d1 through d24 is computed and matched with the parity bits d25 through d30 for the second of these four embodiments of the "hit" word. If there is no match for the second embodiment, the same procedure is repeated for the third embodiment. If there is no match for the third embodiment, for the fourth embodiment the same procedure is repeated. If for any of four embodiments there is a match the modified parity test has been passed, and wherein if for all four embodiments there is no match the modified parity test has been failed.

In the preferred embodiment, if the last word in the frame as defined by the length of frame field in the second header word fails the parity test (standard test or modified test depending on whether the preceding data word was a "pass"

or "hit" word), the synchronization is assumed to be lost and the resynchronization process starts (step 236 or step 238). The resynchronization process 250 comprises the following steps. (See FIG. 10). At first, the PREAMBLE at the beginning of the current message is searched (step 252). If the PREAMBLE is found and the preceding data word was a "hit" word, the first header word is checked for the initial parity test that does not require the knowledge of the last two bits d29* and d30* (both bits d29* and d30* are assumed to be zeroes) of the last "hit" data word of the preceding message (step 212). If the preceding word was a "pass" word, the first header word is checked for the standard parity test. (Step 256). If the first header word passes the initial parity test (or the standard parity test), the second header word is checked for the standard parity test (step 260). The lock is reacquired (step 264), if the PREAMBLE in the first header word of the current message is found, and the first header word of the current message passes the initial (or standard) parity test, and the second header word of the current message passes the standard parity test. For each header word and for each data word the "pass" or the "fail" grade is assigned for the purposes of the higher level testing of the differential corrections (step 266).

In another preferred embodiment, the partial decoding algorithm can proceed with the next data word as if the word that failed was not the last word in the frame. The next word should be the first header word of the next message frame. In this embodiment, the counter of the consecutive word "hits" can be used to "reset" the algorithm and start the resynchronization process again once the number of word "hits" exceeds some predetermined threshold.

In one more preferred embodiment, the flow chart of the partial decode algorithm 280 is depicted in FIG. 11. The first step 282 is the step of matching the PREAMBLE field in the data stream with the PREAMBLE data contained in the user receiver. If the PREAMBLE is recognized, the next step 284 is checking the first header word for the initial parity test. If the first header word does not pass the initial parity test, the algorithm checks the first header word for the station ID (step 288). If the station ID contained in the message matches with the station ID contained in the user receiver, the second header word is checked for the initial parity test (step 292). The lock is assumed to be acquired if the second header word passes the initial parity test and if said station ID contained in the message header matches with the station ID contained in the user receiver. The following steps of the algorithm 280 (steps 296 through 308) are exactly the same steps that are already disclosed above for the preferred embodiment 200 of the partial decode algorithm depicted in FIG. 9. The station ID can be entered by the user, or the previously received station ID can be stored in the user receiver.

The "pass"/"fail" information is used at the higher level integrity testing of the differential corrections. If there is no confidence in the differential data because some of the words in the particular message were identified as the "hit" words, there is a need for integrity check of the differential data for the satellite in question. Even if there is confidence in the differential data because the words in the current message satisfied the parity tests, there is still a need for the integrity check because the differential corrections might not be generated correctly in the first place by the particular RefSta.

Tests are based on the information contained in the previous and current corrections. There are several possible implementations of this test logic. In one embodiment, the test measures the Correction Quality Indicator (CQI), wherein the test is based on the information contained in the current pseudorange correction (PRC), in the current range rate correction (RRC), and in the previous PRC projected to a current time tag. Time t1 is synchronized with the Modified Z-Count for a PRC which was generated at t1; and time t2 is the Modified Z-Count of the current correction received for the tested satellite (or tested RefSta). The Modified Z-Count is defined as the time of the start of the frame as well as the reference time for the message parameters and provides the time into the hour (0 through 3599.4 seconds) and is sent in units of 0.6 seconds. The CQI test (see FIG. 7A) comprises the steps of computing CQI:

$$CQI = PRC_{f2} - [PRC_{f1} + RRC_{f1} * (t2 - t1)],$$

and comparing the computed CQI value with the threshold value T(FAR), wherein the T(FAR) is the threshold value based on a false alarm rate and confidence interval. If the current CQI exceeds the threshold value T(FAR) then a failure is declared and the corrections for the tested satellite (or a combination of tested satellites) are marked as invalid for further use in the user receiver differential solution.

In another preferred embodiment, the test measures the Trimble Correction Quality Indicator (TCQI). The Trimble test is based on the information contained in the current pseudorange corrections (PRC), and in the current range rate correction (RRC) projected to some time t3=(t1+t2)/2, wherein time t1 is synchronized with the Modified Z-Count for a PRC which was generated at t1, and time t2 is the Modified Z-Count of the current correction received for the tested satellite (or RefSta). The Trimble test is also based on the information contained in the previous PRC and RRC projected forward to time t3, wherein t3 can be defined anywhere between t1 and t2. TCQI is valid at time t3 in the middle of the interval defined by the Modified Z-Counts t2 and t1. The method uses all of the correction data contained in two consecutive messages for a particular tested satellite (or RefSta). The TCQI test (see FIG. 7B) method comprises the steps of computing a TCQI value:

$$TCQI = PRC_{f2} - RRC_{f2} * (t2 - t1)/2 - [PRC_{f1} + RRC_{f1} * (t2 - t1)/2];$$

and comparing the computed TCQI value with the threshold value T(FAR), wherein the T(FAR) is the threshold value based on a false alarm rate and confidence interval. If the TCQI exceeds the threshold value T(FAR) then a failure is declared and the corrections for the tested satellite (or a combination of tested satellites) are marked as invalid for further use in the user receiver differential solution.

The simplest message decoder device combined with the SATPS receiver which can be use for the implementation of the above disclosed partial decode algorithm is depicted in FIG. 8. The apparatus 170 is designed for partial decoding of the damaged messages transmitted for the differential mode of operation by a number of Reference Stations (RefSta) that transmit different messages like RTCM1 (176), RTCM2 (178), and GLONASS RTCM (180). The device comprises at least one partial message decoder 172 for decoding the encoded data transmitted by different Reference Stations (RefSta). The device further comprises a differential satellite positioning system (SATPS) receiver 174 that receives the raw positioning data from the SATPS and receives the decoded differential corrections from the partial message decoder 172 for improving the raw positioning data transmitted by the SATPS. The device also includes at least one communication link 173 connecting at least one partial message decoder 172 and the SATPS receiver. The communication link 173 can include a wire link. The communication link 173 can be also a wireless link selected from the class of wireless communication links consisting of a cellular telephone, a radio, a satellite communication link, a wireless WAN/LAN station, or a wireless application services.

The decoder 172 is to accept the encoded RTCM stream of data, decode this data, and output the differential data packets. The definition for the packet can be flexible as long as it contains the necessary information. The decoder can pass the encoded RTCM information to the differential SATPS receiver that can use this data.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A method of checking a partially damaged message using a parity mechanism, said method being used by a differential satellite positioning system (DSATPS), said partially damaged message being transmitted from a base to a rover, said method allows to recover data contained in said damaged message; each said message including a plurality of words; each said message including a header and a plurality of data words following said header, wherein said header includes a first header word and a second header word, wherein said first header word includes a specific PREAMBLE field; wherein said first header word indicates the start of a new message; and wherein said second header word provides the message frame length information; each said header word including n bits including m parity bits; each said data word including n bits including m parity bits; n and m being integers; said method comprising the steps of:

initially synchronizing after a loss of lock said message, wherein said first header word of said message including specific PREAMBLE field is employed for identifying the received information as said message;

testing the parity of said first header word of said message frame using an initial parity test;

testing the parity of said second header word of said message frame using the standard parity test when said first header word passes the initial parity test;

testing the parity of said first data word of said message frame using a standard parity test when said second header word passes the standard parity test;

designating as a "hit" word said first data word if said first data word fails the standard parity test and designating as a "pass" word said first data word if said first data word passes the standard parity test;

testing the parity of each said data word following said "hit" data word using a modified parity test and testing the parity of each said data word following said "pass" data word using the standard parity test;

starting the resynchronization process I, said resynchronization process I comprising the steps of:

searching for the PREAMBLE at the beginning of said current message if said last data word of said preceding message is a "hit" data word;

checking for the initial parity test that does not require the knowledge of the last two bits d29* and d30* of said last "hit" data word of the preceding message said first header word of said current message, wherein said last two bits d29* and d30* of said last "hit" data word of the preceding message are both assumed to be zeroes;

checking for the standard parity test said second header word of said current message; and reacquiring the lock of the current message if the PREAMBLE in said first header word of the current message is found, and said first header word of said current message passes the initial parity test, and said second header word of said current message passes the standard parity test;

starting the resynchronization process II, said resynchronization process II comprising the steps of:

search for the PREAMBLE at the beginning of said current message if said last data word of said preceding message is a "pas" data word;

checking for the standard parity test said first header word and said second word of said current message, wherein when said first header word of said current message is tested the standard parity test employs the known last two bits d29* and d30* of said last "pass" data word of the preceding message, and wherein the standard parity test employs the known last two bits d29** and d30* of said first header word of said current message when said second header word of said current message is tested; and reacquiring the lock of the current message if the PREAMBLE in said first header word of the current message is found, and said first header word of said current message passes the standard parity test, and said second header word of said current message passes the standard parity test; and assigning the "pass" or "fail" grade for each said header word and for each said data word, wherein the record of all "pass" and "fail" words is used for the higher level testing of the differential corrections.

2. The method of claim 1, wherein said message is an RTCM1 message generated by a Reference Station (RefSta) and received by the SATPS receiver, and wherein the step of synchronizing said RTCM1 message further includes the step of:

matching said PREAMBLE 1 field in the data stream with said PREAMBLE 1 data contained in the user receiver.

3. The method of claim 1, wherein said message is an RTCM2 message generated by a Reference Station (RefSta) and received by the SATPS receiver, and wherein the step of synchronizing said RTCM2 message further includes the step of:

matching said PREAMBLE 2 field in the data stream with said PREAMBLE2 data contained in the user receiver.

4. The method of claim 1, wherein said message is an RTCM message generated by a Reference Station (RefSta) and received by the GLONASS receiver, and wherein the step of synchronizing said RTCM message further includes the step of:

matching said PREAMBLEg field in the data stream with said PREAMBLEg data contained in the user receiver.

5. The method of claim 1, wherein each said message consists of 30-bit words numbered 1, 2, . . . M, wherein each said 30-bit word consists of d1, d2, . . . d24, d25, d26, . . . d29, d30 bits, d25 through d30 being the parity bits, wherein bits d29* and d30* indicate the last two bits of the said parity bits of the previous word, and wherein the standard parity test includes the steps of:

computing the checksum based on d29*, d30* and d1 through d24; and checking said checksum for the match with the parity bits contained in the bits d25 through d30; wherein if there is a match the standard parity test has been passed, and wherein the standard parity test has been failed if there is no match.

6. The method of claim 1, wherein each said message consists of 30-bit words numbered 1, 2, ... M, wherein each said 30-bit word consists of d1, d2, ... d24, d25, d26, ... d29, d30 bits, d25 through d30 being the parity bits, wherein bits d29* and d30* indicate the last two bits of the said parity bits of the previous word, and wherein the initial parity test further includes the steps of:

assuming that said d29* and d30* bits are both zeroes;

making the direct comparison of said d1 through d8 bits to said PREAMBLE stored in the receiver;

setting d30* to a one, inverting data bits d1 through d8, inverting said stored PREAMBLE, and making the inverted comparison of said inverted data bits d1 through d8 to said inverted PREAMBLE if the direct comparison fails;

computing the checksum based on d29* d30* and d1 through d24 if either direct or inverted comparison does not fail;

checking the checksum for the match with the parity bits contained in the bits d25 through d30; and recomputing the checksum based on d29*, d30 and d1 through d24 by setting d29* to a one if the match is not found and checking the checksum for the match again.

7. The method of claim 1, wherein the modified parity test further includes the step of:

modifying a "hit" word by changing the last two bits of said "hit" word; wherein said current word immediately follows said "hit" word; wherein said last two bits of said "hit" word have four different sates; and wherein said first state is a "0" state for said last but one bit d29*; and a "0" state for said last bit d30*; and wherein said second state is a "0" state for said last but one bit d29*, and a "1" state for said last bit d30*; and wherein said third state is a "1" state for said last but one bit d29*, and a "0" state for said last bit d30*; and wherein said fourth state is a "1" state for said last but one bit d29*, and a "1" state for said last bit d30*;

computing for said first embodiment of said "hit" word a first checksum based on d29* and d30* and d1 through d24 and matching said first checksum with the parity bits d25 through d30;

computing for said second embodiment of said "hit" word a second checksum based on d29* and d30* and d1 through d24 and matching said second checksum with the parity bits d25 through d30 if there is no match for said first checksum;

computing for said third embodiment of said "hit" word a third checksum based on d29* and d30* and d1 through d24 and matching said third checksum with the parity bits d25 through d30 if there is no match for said second checksum;

computing for said fourth embodiment of said "hit" word a fourth checksum based on d29* and d30* and d1 through d24 and matching said fourth checksum with the parity bits d25 through d30 if there is no match for said third checksum wherein if for any of said four embodiments there is a match the modified parity test has been passed, and wherein if for all four embodiments there is no match the modified parity test has been failed.

8. A method of checking a partially damaged message using a parity mechanism, said method being used by a differential satellite positioning system (DSATPS), said partially damaged message being transmitted from a base to a rover, said method allows to recover data containing in said damaged message; each said message including a plurality of words; each said message including a header and a plurality of data words following said header, wherein said header includes a first header word and a second header word, wherein said first header word includes a specific PREAMBLE field; wherein said first header word indicates the start of a new message; and wherein said second header word provides the message frame length information; each said header word including n bits including m parity bits; each said data word including n bits including m parity bits; n and m being integers; said method comprising the steps of:

matching said PREAMBLE field in the data stream with said PREAMBLE data contained in the user receiver;

checking said first header word for an initial parity test;

checking said first header word for the station ID if said first header word does not pass the initial parity test;

checking said second header word of the initial parity test if said first header word does not pass the initial parity test and if said station ID contained in said message matches with the station ID contained in the user receiver;

acquiring the lock if said second header word passes the initial parity test and if said station ID contained in said message matches with the station ID contained in the user receiver;

testing the parity of each said current data word of said message using a standard parity test;

designating as a "hit" word said first data word if said first data word fails the standard parity test and designating as a "pass" word said first data word if said first data word passes the standard parity test;

testing the parity of each said data word following said "hit" data word using a modified parity test and testing the parity of each said data word following said "pass" data word using the standard parity test;

starting the resynchronization process; said process comprising the steps of:

searching for the PREAMBLE at the beginning of said current message;

checking said first header word and said second word of said current message for the initial parity test that does not require the knowledge of the last two bits d29* and d30* of said last data word of said preceding message;

checking said first header word for the station ID; and reacquiring the lock if the PREAMBLE in said first header word of the current message is found, and if station ID contained in said message matches with the station ID contained in the user receiver, and if said first header word of said current message does not pass the initial parity test, and if said second header word of said current message passes the initial parity test that does not require the knowledge of the last two bits d29* and d30* of said first header word of said current message; and assigning the "pass" or "fail" grade for each said header word and for each said data word, wherein the record of all "pass" and "fail" words is used for the higher level testing of the differential corrections.

9. The method of claim 8, wherein the step of checking said first header word for the station ID further includes the step of entering the station ID by the user.

10. The method of claim 8, wherein the step of checking said first header word for the station ID further includes the step of storing the previously received station ID.

11. The method of claim 8, wherein said message is an RTCM1 message generated by a RefSta and received by the SATPS receiver, and wherein the step of matching said PREAMBLE field in the data stream with said PREAMBLE data contained in the user receiver further includes the step of:

matching said PREAMBLE 1 field in the data stream with said PREAMBLE 1 data contained in the user receiver.

12. The method of claim 8, wherein said message is an RTCM2 message generated by a RefSta and received by the SATPS receiver, and wherein the step of matching said PREAMBLE field in the data stream with said PREAMBLE data contained in the user receiver further includes the step of:

matching said PREAMBLE 2 field in the data stream with said PREAMBLE2 data contained in the user receiver.

13. The method of claim 8, wherein said message is a GLONASS RTCM message generated by a RefSta and received by the GLONASS receiver, and wherein the step of matching said PREAMBLE field in the data stream with said PREAMBLEg data contained in the user receiver further includes the step of:

matching said PREAMBLEg field in the data stream with said PREAMBLEg data contained in the user receiver.

* * * * *